US010847179B2

(12) United States Patent
Li et al.

(10) Patent No.: US 10,847,179 B2
(45) Date of Patent: Nov. 24, 2020

(54) METHOD, APPARATUS AND DEVICE FOR RECOGNIZING VOICE ENDPOINTS

(71) Applicant: BAIDU ONLINE NETWORK TECHNOLOGY (BEIJING) CO., LTD., Beijing (CN)

(72) Inventors: Chao Li, Beijing (CN); Weixin Zhu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 124 days.

(21) Appl. No.: 16/236,267

(22) Filed: Dec. 28, 2018

(65) Prior Publication Data
US 2019/0362741 A1 Nov. 28, 2019

(30) Foreign Application Priority Data
May 24, 2018 (CN) .......................... 2018 1 0509977

(51) Int. Cl.
*G10L 15/00* (2013.01)
*G10L 25/87* (2013.01)
(Continued)

(52) U.S. Cl.
CPC .............. *G10L 25/87* (2013.01); *G06N 3/084* (2013.01); *G10L 25/30* (2013.01); *G10L 15/00* (2013.01); *G10L 15/22* (2013.01)

(58) Field of Classification Search
CPC ......... G10L 15/18; G10L 15/93; G10L 15/26; G10L 15/16
(Continued)

(56) References Cited

U.S. PATENT DOCUMENTS 6,370,500 B1* 4/2002 Huang .................. G10L 19/012
704/207
2008/0040110 A1* 2/2008 Pereg ...................... G10L 17/26
704/236
(Continued)

FOREIGN PATENT DOCUMENTS

CN 104409080 A 3/2015
CN 105118502 A 12/2015
(Continued)

OTHER PUBLICATIONS

The Japanese Examination Report of corresponding Japanese application No. 2018-244352, dated Feb. 12, 2020.
(Continued)

*Primary Examiner* — Michael Colucci
(74) *Attorney, Agent, or Firm* — J.C. Patents

(57) ABSTRACT

The present disclosure provides a method, an apparatus and a device for recognizing voice endpoints. In the method of the present disclosure, a start point recognition model and a finish point recognition model are obtained by training a cyclic neural network with a start point training set and a finish point training set, respectively, and a voice start point frame among audio frames is recognized according to each of acoustic features of the audio frames and the start point recognition model, thereby avoiding affecting a delay time of the finish point frame recognition while ensuring the accuracy of the start frame recognition as high as possible; and a voice finish point frame among the audio frames is recognized according to the acoustic features of the audio frames and the finish point recognition model.

15 Claims, 7 Drawing Sheets

(51) Int. Cl.
*G06N 3/08* (2006.01)
*G10L 25/30* (2013.01)
*G10L 15/22* (2006.01)

(58) Field of Classification Search
USPC ......................................................... 704/248
See application file for complete search history.

(56) References Cited

U.S. PATENT DOCUMENTS

| | | | | |
|---|---|---|---|---|
| 2012/0072211 | A1* | 3/2012 | Edgington | G10L 15/04 704/231 |
| 2012/0253812 | A1* | 10/2012 | Kalinli | G10L 15/05 704/254 |
| 2014/0201126 | A1* | 7/2014 | Zadeh | A61B 5/165 706/52 |
| 2016/0379632 | A1* | 12/2016 | Hoffmeister | G10L 15/26 704/253 |
| 2018/0047385 | A1* | 2/2018 | Jiang | G10L 25/30 |
| 2018/0082677 | A1* | 3/2018 | Yaghi | G06N 3/08 |
| 2018/0204111 | A1* | 7/2018 | Zadeh | G06K 9/3233 |
| 2018/0308487 | A1* | 10/2018 | Goel | G10L 15/26 |

FOREIGN PATENT DOCUMENTS

| | | |
|---|---|---|
| CN | 106611598 A | 5/2017 |
| CN | 107527630 A | 12/2017 |
| CN | 108010515 A | 5/2018 |
| JP | H04-198997 A | 7/1992 |
| JP | H11-024692 A | 1/1999 |
| JP | 2016-061890 A | 4/2016 |
| JP | 2018-523156 A | 8/2018 |
| JP | 2019-028405 A | 2/2019 |
| JP | 2019-040148 A | 3/2019 |

OTHER PUBLICATIONS

The Chinese First Examination Report of corresponding Chinese application No. 201810509977.4, dated Apr. 29, 2019.

* cited by examiner

METHOD, APPARATUS AND DEVICE FOR RECOGNIZING VOICE ENDPOINTS

CROSS-REFERENCE TO RELATED APPLICATION

This application claims priority to Chinese Patent Application No. 201810509977.4, filed on May 24, 2018, which is hereby incorporated by reference in its entirety.

TECHNICAL FIELD

The present disclosure relates to the field of voice recognition and in particular, to a method, an apparatus and a device for recognizing voice endpoints.

BACKGROUND

With the increasing popularity of voice search service, more and more people begin to use their own voice as a means of interaction. A user uploads an inputted audio to a server through a mobile terminal, and the server performs voice recognition according to the audio. In voice interaction, accurately recognizing start and finish points of a voice is an important part of the voice recognition.

In the prior art, a Voice Activity Detector (VAD) model is used to determine start and finish points of a voice. In voice recognition, it is required that an accuracy of a voice start point detection is as high as possible, and a delay of a voice finish point is as short as possible. Current VAD models recognize the start point and the end point by using a same process model, so that the recognition of the start point is inaccurate, and false detection and missed detection of the start point occur, resulting in a decrease in system performance; or a delay time of the finish point recognition is too long, resulting in an overly long delay of a response to the user.

SUMMARY

The present disclosure provides a method, an apparatus and a device for recognizing voice endpoints to solve a problem that the existing VAD model recognizes the start point and the ending point by using a same process model, so that the recognition of the start point is inaccurate, and false detection and missed detection of the start point occur, resulting in the decrease in the system performance; or the delay time of the finish point recognition is too long, resulting in overly long delay of the response to the user.

An aspect of the present disclosure provides a method for recognizing voice endpoints, including:

Extracting an acoustic feature of each of audio frames of an audio to be detected;

recognizing a voice start point frame among the audio frames according to the acoustic feature of each of the audio frames and a start point recognition model, where the start point recognition model is obtained by training a neural network with a start point training set; and recognizing a voice finish point frame among the audio frames according to the acoustic feature of each of the audio frames and a finish point recognition model, where the finish point recognition model is obtained by training the neural network with a finish point training set.

Another aspect of the present disclosure provides a voice endpoint recognition apparatus, including:

a feature extraction module, configured to an extract acoustic feature of each of audio frames of an audio to be detected;

a start point recognition module, configured to recognize a voice start point frame among the audio frames according to the acoustic feature of each of the audio frames and a start point recognition model, where the start point recognition model is obtained by training a neural network with a start point training set; and a finish point recognition module, configured to recognize a voice finish point frame among the audio frames according to the acoustic feature of each of the audio frames and a finish point recognition model, where the finish point recognition model is obtained by training the neural network with a finish point training set.

Another aspect of the present disclosure provides a computer device including:

a memory, a processor, and a computer program stored on the memory and operable on the processor the processor, when running the computer program, implements the method for recognizing the voice endpoints described above.

Another aspect of the present disclosure provides a computer readable storage medium with a computer program stored therein, the computer program, when executed by a processor, implements the method for recognizing the voice endpoints described above.

In the method, apparatus and device for recognizing voice endpoints according to the present disclosure, a start point recognition model and a finish point recognition model are obtained by training a cyclic neural network with a start point training set and a finish point training set, respectively, and a voice start point frame among audio frames is recognized according to each of acoustic feature of the audio frames and the start point recognition model, thereby avoiding affecting a delay time of the end frame recognition while ensuring the accuracy of the start frame recognition as high as possible; and a voice finish point frame among the audio frames is recognized according to the acoustic features of the audio frames and the finish point recognition model, thereby avoiding affecting the accuracy of the start frame recognition while ensuring the delay of the end frame recognition is as short as possible, so that the delay time of the end frame recognition is shortened while the accuracy of the start frame recognition is improved.

BRIEF DESCRIPTION OF THE DRAWINGS

The drawings herein are incorporated in the specification and constitute a part of the specification. Embodiments consistent with the present disclosure are shown and used together with the specification to explain principle of the present disclosure.

Figure 1:
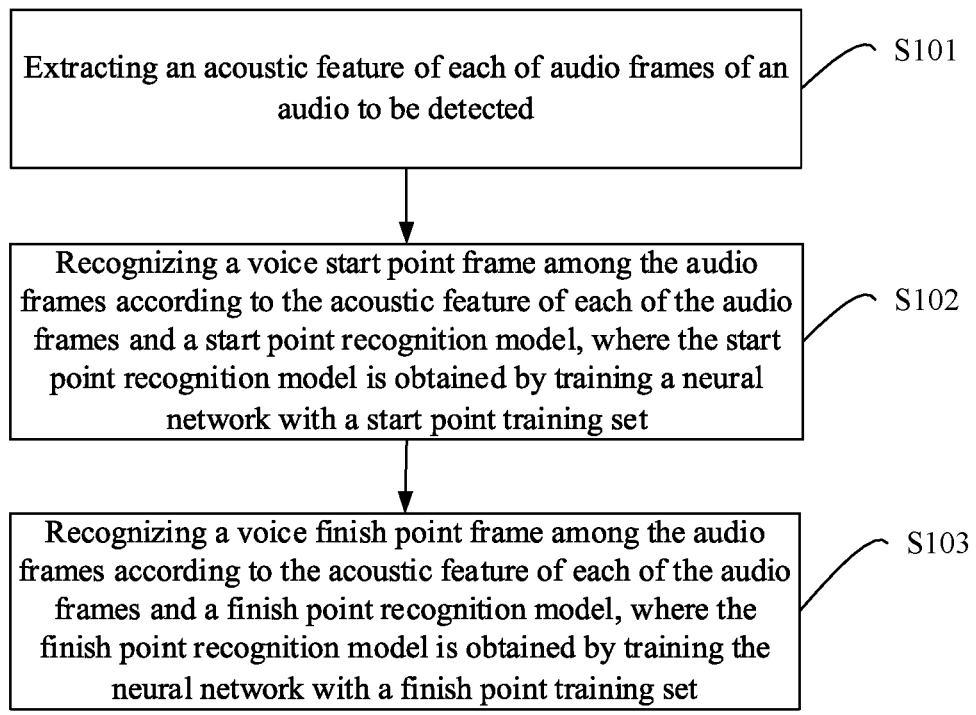
FIG. 1 is a flowchart of a method for recognizing voice endpoints according to Embodiment 1 of the present disclosure.

The embodiments of the present disclosure have been shown through the foregoing drawings and are described in detail below. The drawings and the written description are not intended to limit the scope of the present disclosure in any way, but the concept of the present disclosure will be described for those skilled in the art by referring to specific embodiments.

DESCRIPTION OF EMBODIMENTS

Exemplary embodiments will be described in detail here, examples of which are illustrated in the accompanying drawings. When the following description refers to the accompanying drawings, a same number in different drawings represents a same or similar element, unless otherwise indicated. The implementations described in the following exemplary embodiments do not represent all implementations consistent with the present disclosure. Instead, they are merely examples of apparatuses and methods consistent with some aspects of the present disclosure as detailed in the appended claims.

First, the terms involved in the present disclosure are explained:

Voice Activity Detector (VAD): which is also referred to as voice action detection, voice endpoint detection, or voice boundary detection, is a technique for recognizing and eliminating a long silent segment from an audio signal flow.

A Posteriori Probability: which refers to a probability obtained by acquiring a new additional information through surveys or other means and correcting a priori probability using Bayesian formula. The posteriori probability, which refers to a re-corrected probability after information of a "result" is obtained, is the "result" in a problem of "seeking a cause according to the result".

A Priori Probability: which refers to a probability derived from past experience and analysis, such as a full-probability formula and often appears as the "cause" in a problem of "seeking a result according to the cause" problem. The priori probability is defined by a classical probability model, so it is also referred to as a classical probability.

Extraction of acoustic feature: which is an important part of voice recognition. The extraction of acoustic feature is not only a process of large-scale compression of information, but also a process of signal deconvolution, and the purpose of the extraction of acoustic feature is to enable a better division of a mode divider. Due to a time-varying characteristic of a voice signal, feature extraction must be performed on a small segment of the voice signal, that is, a short-time analysis is performed. This segment, which is considered to be a stationary analysis interval, is referred to as a frame, and an offset between frames generally takes a value of ½ or ⅓ of a frame length. It is common to pre-emphasize the signal to boost a high frequency and window the signal to avoid an effect of an edge of a short-time voice segment.

Moreover, the terms "first", "second", or the like are used for descriptive purposes only, and should not be construed as indicating or implying a relative importance or implicitly showing the number of technical features indicated. In the following description of the various embodiments, the meaning of "multiple" is two or more unless specifically defined otherwise.

The following specific embodiments may be combined with each other, and a same or similar concept or process may not be repeated in some embodiments. The embodiments of the present disclosure will be described below in conjunction with the accompanying drawings.

Embodiment 1

FIG. 1 is a flowchart of a method for recognizing voice endpoints according to Embodiment 1 of the present disclosure. The embodiment of the present disclosure provides a method for recognizing voice endpoints, aiming at the problem that current VAD models recognize a start point and a finish point by using a same process model, so that the recognition of the start point is inaccurate, and false detection and missed detection of the start point occur, resulting in a decrease in the system performance; or a delay time of the finish point recognition is too long, resulting in an overly long delay of a response to the user. As shown in FIG. 1, the specific steps of the method are as follows:

Step S101, extracting an acoustic feature of each of audio frames of an audio to be detected.

In this embodiment, it is preferable to obtain each of the audio frames of the audio to be detected, and extract the acoustic feature of each of the audio frames, respectively.

Where the acoustic feature may be a Mel Frequency Cepstral Coefficient (MFCC), a Perceptual Linear Predictive (PLP), or the like.

Step S102, recognizing a voice start point frame among the audio frames according to the acoustic feature of each of the audio frames and a start point recognition model, where the start point recognition model is obtained by training a neural network with a start point training set.

In this embodiment, the start point training set includes at least one set of start point training data, and one set of start point training data includes an acoustic feature and annotation information of each frame of a start point training audio. The finish point training set includes at least one set of finish point training data, and one set of finish point training data includes an acoustic feature and annotation information of each frame of a finish point training audio.

In actual applications, this embodiment includes two phases: a training phase and a detecting phase.

The training phase is a process of obtaining the start point recognition model and the finish point recognition model by training before recognizing the endpoints of the audio to be detected. The training phase specifically includes:

pre-acquiring a training pre-material for voice recognition, where the training pre-material is a real voice material in actual use, including multiple sample audios, for example, the training pre-material may include 10,000 user-inputted audios, each of the audios is approximately a few seconds in length; frame-division processing each of the sample audios in the training pre-material to obtain multiple audio frames, extracting an acoustic feature of each of the audio frames by using a preset feature extraction method, and obtaining annotation information of each of the audio frames.

intercepting a first audio segment of an initial first duration of the sample audio, where the first audio segment includes a voice start point of the sample audio; taking the first audio segment as a start point training audio, and taking the acoustic features and the annotation information of the audio frames of the first audio segment as a set of start point training data corresponding to the start point training audio, and adding the set of start point training data to the start point training set.

intercepting a second audio segment of a last second duration of the sample audio, where the second audio segment includes a voice finish point of the sample audio; taking the second audio segment as an finish point training audio, and taking the acoustic features and the annotation information of the audio frames of the second audio segment as a set of finish point training data corresponding to the finish point training audio, and adding the set of finish point training data to the finish point training set.

The start point recognition model and the finish point recognition model used here are obtained by training a cyclic neural network with different training data sets. The start point recognition model may be obtained by using the start point training set to train the cyclic neural network model, and the finish point training set may be obtained by using the finish point training set to train the cyclic neural network model.

The start point recognition model is obtained by training a neural network with the start point training set, and the finish point recognition model is obtained by training a neural network with the finish point training set.

In the detecting phase, through steps S101-S103, the acoustic feature of each of the audio frames of the audio to be detected is extracted, and a voice start point frame and a voice finish point frame of the audio to be detected are respectively recognized according to the acoustic feature of each of the audio frames of the audio to be detected as well as the start point recognition model and the finish point recognition model, so that the voice start point and the voice finish point of the audio to be detected can be determined.

After the acoustic feature of each of the audio frames is acquired, in this step, the voice start point frame among the audio frames can be recognized based on the acoustic feature of each of the audio frames and the start point recognition model.

Optionally, the acoustic feature of each of the audio frame may be sequentially inputted into the start point recognition model, and whether the current audio frame is the voice start point frame of the audio to be detected is determined according to an output value of the start point recognition model; if the current audio frame is not the voice start point frame, a next frame is successively inputted into the start point recognition model to determine whether the next frame is the voice start point frame of the audio to be detected, and when the voice start point frame is determined, the subsequent audio frame is stopped from being inputted into the start point recognition model.

Step S103, recognizing the voice finish point frame among the audio frames according to the acoustic feature of each of the audio frames and the finish point recognition model, where the finish point recognition model is obtained by training a neural network with a finish point training set.

After the acoustic feature of each audio frame is acquired, in this step, the voice finish point frame among the audio frames can be recognized based on the acoustic feature of each of the audio frames and the finish point recognition model.

Optionally, after the voice start point frame is recognized, each of audio frames after the voice start point frame of the audio to be detected is sequentially inputted into the finish point recognition model, and whether the current audio frame is the voice finish point frame of the audio to be detected is determined according to an output value of the finish point recognition model; if the current audio frame is not the voice finish point frame, a next frame is successively inputted into the finish point recognition model to determine whether the next frame is the voice finish point frame of the audio to be detected, and when the voice finish point frame is determined, the subsequent audio frame is stopped from being inputted into the finish point recognition model.

In addition, in another embodiment of the present embodiment, the audio frames may be sequentially inputted into the finish point recognition model in reverse chronological order. The voice finish point frame of the audio to be detected is first recognized, and then the audio frames previous the voice finish point frame is successively inputted into the start point recognition model to recognize the voice start point frame of the audio to be detected. The order of recognizing the voice start point frame and the voice finish point frame is not specifically limited in this embodiment.

In the embodiment of the present disclosure, a start point recognition model and a finish point recognition model are obtained by training a cyclic neural network with a start point training set and a finish point training set, respectively, and a voice start point frame among audio frames is recognized according to an acoustic feature of each of the audio frames and the start point recognition model, thereby avoiding affecting a delay time of a finish point frame recognition while ensuring the accuracy of the start frame recognition as high as possible; and a voice finish point frame among the audio frames is recognized according to the acoustic features of each of the audio frames and the finish point recognition model, thereby avoiding affecting the accuracy of the start frame recognition while ensuring the delay time of the end frame recognition as short as possible, so that the delay time of the end frame recognition is shortened while the accuracy of the start frame recognition is improved.

Embodiment 2

Figure 2:
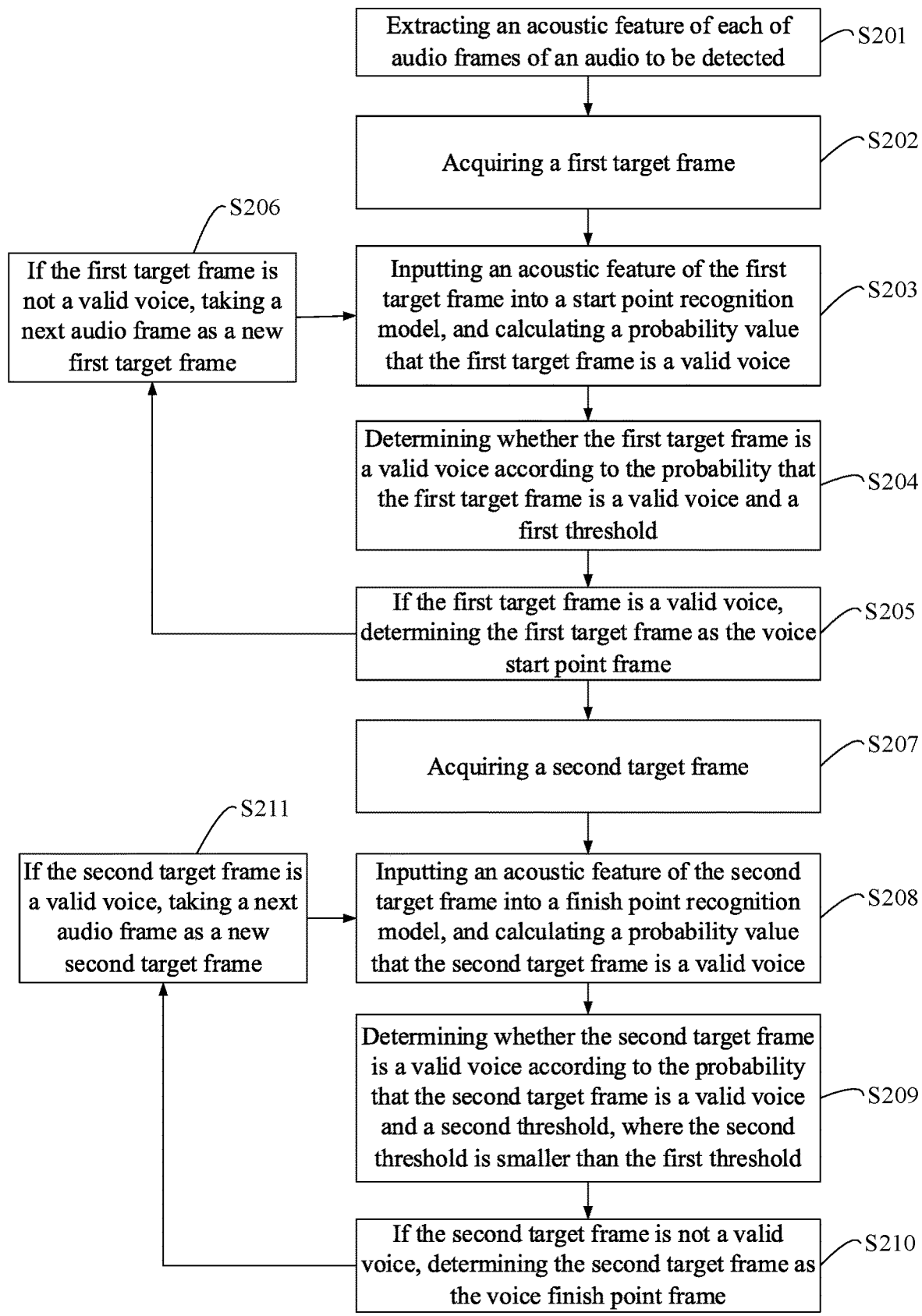
FIG. 2 is a flowchart of a method for recognizing voice endpoints according to Embodiment 2 of the present disclosure.

FIG. 2 is a flowchart of a method for recognizing voice endpoints according to Embodiment 2 of the present disclosure. On the basis of Embodiment 1 described above, in this embodiment, the acoustic feature of each of the audio frames may be sequentially inputted into the start point recognition model, and whether the current audio frame is the voice start point frame of the audio to be detected is determined according to an output value of the start point recognition model; if the current audio frame is not the voice start point frame, a next frame is successively inputted into the start point recognition model to determine whether the next frame is the voice start point frame of the audio to be detected, and when the voice start point frame is determined, the subsequent audio frame is stopped from being inputted into the start point recognition model; after the voice start point frame is recognized, each of audio frames after the voice start point frame of the audio to be detected is sequentially inputted into the finish point recognition model, and whether the current audio frame is the voice finish point frame of the audio to be detected is determined according to an output value of the finish point recognition model; if the current audio frame is not the voice finish point frame, a next frame is successively inputted into the finish point recognition model to determine whether the next frame is the voice finish point frame of the audio to be detected, and when the voice finish point frame is determined, the subsequent audio frame is stopped from being inputted into the finish point recognition model. As shown in FIG. 2, the specific steps of the method are as follows:

Step S201, extracting an acoustic feature of each of audio frames of an audio to be detected.

This step is the same as the above step S101, and details will not be repeated here again.

Step S202, acquiring a first target frame.

In the embodiment, the audio frames is sequentially taken as the first target frame according to the time sequence of each of the audio frames in the audio to be detected, and a start point recognition process is performed on the first target frame through steps S203-S206.

Step S203, inputting an acoustic feature of the first target frame into a start point recognition model, and calculating a probability value that the first target frame is a valid voice.

The start point recognition model is a cyclic neural network model, and the start point recognition model is configured to calculate and output the probability value that the first target frame is a valid voice according to the inputted acoustic feature of the first target frame.

Optionally, the probability value that the first target frame is a valid voice may be a posteriori probability value that the first target frame is a valid voice.

Step S204, determining whether the first target frame is a valid voice according to the probability that the first target frame is a valid voice and a first threshold.

This step can be specifically implemented as follows:

comparing the probability that the first target frame is a valid voice with the first threshold; if the probability that the first target frame is a valid voice is greater than the first threshold, determining that the first target frame is a valid voice; if the probability that the first target frame is a valid voice is smaller than or equal to the first threshold, determining that the first target frame is not a valid voice.

The first threshold may be set by a technician according to actual needs, and is not specifically limited in this embodiment.

Step S205, if the first target frame is a valid voice, determining the first target frame as a voice start point frame.

In this step, if the first target frame is a valid voice, it indicates that the first target frame is an audio frame, which is a valid voice, firstly appearing in the audio to be detected, and the first target frame is taken as the voice start point frame.

Optionally, after the first target frame is determined as the voice start point frame, a starting moment of the voice start point frame may further be taken as the voice start point of the audio to be detected.

After the voice start point frame is determined in this step, steps S207-S211 are successively performed to determine the voice finish point frame from the subsequent audio frames.

Step S206, if the first target frame is not a valid voice, taking a next audio frame as a new first target frame.

If the first target frame is not a valid voice, it indicates that the first audio frame, which is a valid voice, in the audio to be detected has not appeared, and the next audio frame is taken as the new first target frame, and steps S203-S206 are successively performed on the new first target frame to perform the start point recognition process on the new first target frame.

Step S207, acquiring a second target frame.

After the voice start point frame is determined, audio frames after the voice start point frame are sequentially taken as the second target frame, and a finish point recognition process is performed on the second target frame using subsequent steps S207-S211.

Step S208, inputting an acoustic feature of the second target frame into a finish point recognition model, and calculating a probability value that the second target frame is a valid voice.

The finish point recognition model is a cyclic neural network model, and the finish point recognition model is configured to calculate and output the probability value that the second target frame is a valid voice according to the inputted acoustic features of the second target frame.

Optionally, the probability value that the second target frame is a valid voice may be a posteriori probability value that the second target frame is a valid voice.

Step S209, determining whether the second target frame is a valid voice according to the probability that the second target frame is a valid voice and a second threshold, where the second threshold is smaller than the first threshold.

This step can be specifically implemented as follows:

comparing the probability that the second target frame is a valid voice and the second threshold; if the probability that the second target frame is a valid voice is greater than the second threshold, determining that the second target frame is a valid voice; if the probability that the second target frame is a valid voice is smaller than or equal to the second threshold, determining that the second target frame is not a valid voice.

The second threshold is smaller than the first threshold. For example, the first threshold may be 0.6, and the second threshold may be 0.4.

The second threshold may be set by a technician according to actual needs, and is not specifically limited in this embodiment.

Step S210, if the second target frame is not a valid voice, determining the second target frame as the voice finish point frame.

In this step, if the second target frame is not a valid voice, it indicates that the second target frame is an audio frame, which is not a valid voice, firstly appearing in the audio to be detected after the start voice frame, and the second target frame is determined as the voice finish point frame.

Optionally, after the second target frame is determined as the voice finish point frame, a starting moment of the voice finish point frame may further be taken as the voice finish point of the audio to be detected.

Step S211, if the second target frame is a valid voice, taking a next audio frame as a new second target frame.

If the second target frame is a valid voice, it indicates that an audio frame, which is not a valid voice, has not appeared after the voice start point frame in the audio to be detected, and the next audio frame is taken as the new second target frame, and steps S208-S211 are successively performed on the new second target frame to perform the finish point recognition process on the new second target frame.

The finish point recognition process is performed on the new second target frame through steps S208-S211.

In the embodiment of the present disclosure, the acoustic feature of each of the audio frames may be sequentially inputted into the start point recognition model, and whether the current audio frame is the voice start point frame of the audio to be detected is determined according to an output value of the start point recognition model, if the current audio frame is not the voice start point frame, a next frame is successively inputted into the start point recognition model to determine whether the next frame is the voice start point frame of the audio to be detected, and when the voice start point frame is determined, the subsequent audio frame is stopped from being inputted into the start point recognition model; after recognizing the voice start point frame, each of audio frame after the voice start point frame of the audio to be detected is sequentially inputted into the finish point recognition model, and whether the current audio frame is the voice finish point frame of the audio to be detected is determined according to an output value of the finish point recognition model; if the current audio frame is not the voice finish point frame, a next frame is successively inputted into the finish point recognition model to determine whether the next frame is the voice finish point frame of the audio to be detected, and when the voice finish point frame is determined, the subsequent audio frame is stopped from being inputted into the finish point recognition model, thereby the efficiency of voice endpoint recognition can be improved.

Embodiment 3

Figure 3:
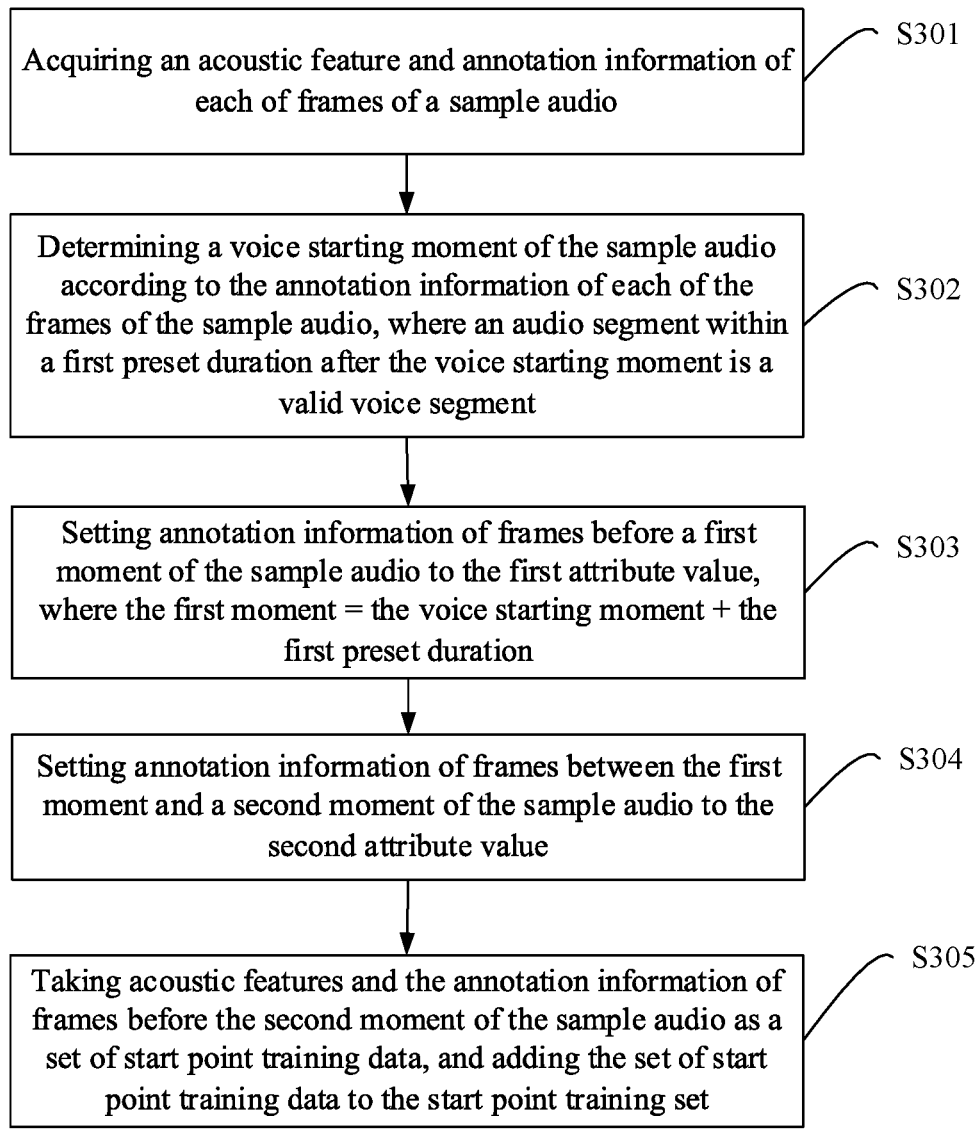
FIG. 3 is a flowchart for determining a start point training set according to Embodiment 3 of the present disclosure.
Figure 4:
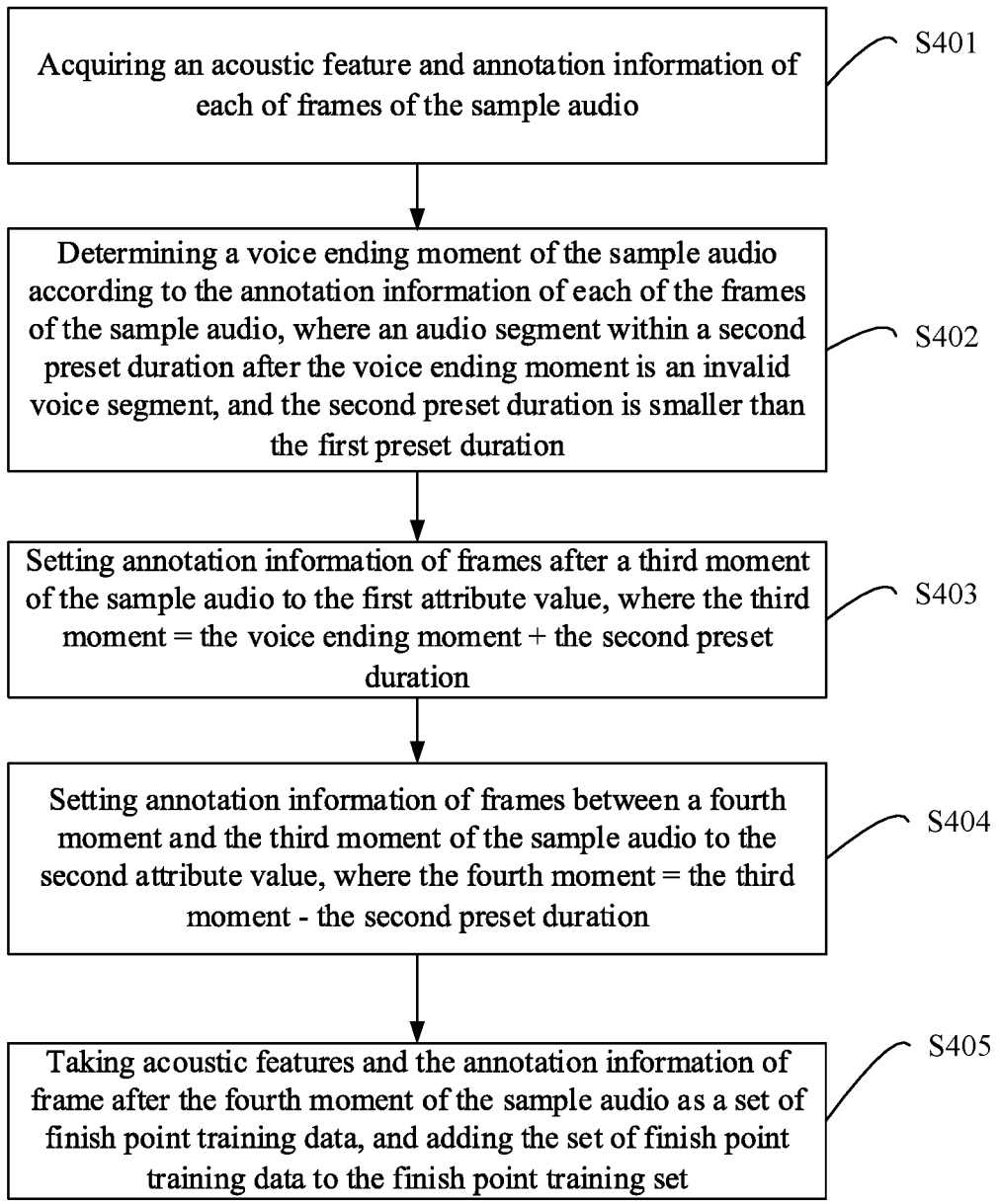
FIG. 4 is a flowchart for determining a finish point training set according to Embodiment 3 of the present disclosure.

FIG. 3 is a flowchart for determining a start point training set according to Embodiment 3 of the present disclosure; FIG. 4 is a flowchart for determining a finish point training set according to Embodiment 3 of the present disclosure. On the basis of Embodiment 1 or Embodiment 2 described above, in this embodiment, before recognizing the endpoints of the audio to be detected, it is required to train a cycle neural network by respectively using the start point training set and the finish point training set in advance to obtain the start point recognition model and the finish point recognition model. This phase is a phase of training the model, which specifically includes three stages: preparing training data, determining the start point training set and the finish point training set, and model training.

In this embodiment, the start point training set includes at least one set of start point training data, and one set of start point training data includes an acoustic feature and annotation information of each of frames of a start point training audio. The finish point training set includes at least one set of finish point training data, and one set of finish point training data includes an acoustic feature and annotation information of each of frame of a finish point training audio.

The annotation information is a first attribute value or a second attribute value, and the annotation information is used to annotate whether the sample is a valid voice. The annotation information being the first attribute value indicates that the audio frame is an invalid voice, the annotation information being the second attribute value indicates that the audio frame is a valid voice, and the second attribute value is different from the first attribute value.

For example, the first attribute value is 0, and the second attribute value is 1; or the first attribute value is "N", and the second attribute value is "Y", or the like. The embodiment does not specifically limit the specific data structure of the first attribute value and the second attribute value.

Optionally, the set of start point training data corresponding to the start point training audio may be stored by using a structure of {X, Y}, where X is a sequence in which the acoustic feature of each of the audio frames in the set of start point training data is arranged in chronological order, X may be referred to as a feature sequence of the set of start point training data; Y is a sequence in which the annotation of each of the audio frames in the set of start point training data is arranged in a sequence consistent with the feature sequence, and Y may be referred to as an annotation sequence of the set of start point training data.

Optionally, the annotation information of the audio frame may be manually annotated, or obtained by using a machine forced alignment manner in the voice recognition. The method for annotating the audio frame is not specifically limited in this embodiment.

The phase of preparing training data includes: pre-acquiring a training pre-material of voice recognition, where the training pre-material is a real voice material in actual use, including multiple sample audios, for example, the training pre-material includes 10,000 user-inputted audios, each of which is approximately a few seconds in length; frame-division processing each of sample audios in the training pre-material to obtain multiple audio frames, extracting the acoustic feature of each of the audio frames by using a preset feature extraction method, and obtaining annotation information of each of the audio frames.

In the training phase, the extraction of the acoustic features of the audio frames is implemented by using the same feature extraction method as that used for the extraction of the acoustic features of the audio frames of the audio to be detected in the detecting phase, so as to improve the accuracy of the audio frame recognition.

Optionally, the method for frame-division processing a certain audio segment in the training pre-material may be implemented by using the same manner as that used for frame-division processing the audio to be detected in the detecting phase, so as to improve the accuracy of the audio frame recognition.

Due to a time-varying characteristic of a voice signal, acoustic feature extraction must be performed on a small segment of voice signal, that is, a short-time analysis is performed. This section, which is considered to be a stationary analysis interval, is referred to as a frame, and an offset between frames generally takes a value of ½ or ⅓ of a frame length. For a certain audio segment in the training pre-material, one frame may be extracted after a preset duration, and a frame length of each frame is a preset frame length, and the frame-division processing is performed on that audio segment to obtain multiple audio frames.

For example, one frame may be extracted after a preset duration, and the frame length of each frame is a preset frame length, and the frame processing is performed on that audio segment to obtain multiple audio frames. Optionally, the preset duration may be 10 milliseconds, and the preset frame length may be 25 milliseconds.

The phase of determining the start point training set and the finish point training set includes: for any sample audio in the training pre-material, intercepting a first audio segment of an initial first duration of the sample audio, where the first audio segment includes a voice start point of the sample audio; taking the first audio segment as a start point training audio, and taking the acoustic features and the annotation information of the audio frames of the first audio segment as a set of start point training data corresponding to the start point training audio, and adding the set of start point training data to the start point training set; and intercepting a second audio segment of a last second duration of the sample audio, where the second audio segment includes a voice finish point of the sample audio; taking the second audio segment as a finish point training audio, taking the acoustic features and the annotation information of the audio frames of the second audio segment as a set of finish point training data corresponding to the finish point training audio, and adding the set of start point training data to the finish point training set.

In the embodiment, as shown in FIG. 3, determining the start point training set may be specifically implemented by the following steps:

Step S301, acquiring an acoustic feature and annotation information of each of frames of a sample audio.

Step S302, determining a voice starting moment of the sample audio according to the annotation information of each of the frames of the sample audio, where an audio segment within a first preset duration after the voice starting moment is a valid voice segment.

The first preset duration is a delay time for ensuring the confidence of the voice start point when determining the start point of the voice. The first preset duration may be set by a technician according to actual needs. The value of the first preset duration is not specifically limited in this embodiment. For example, the first preset duration may be a duration of 20 frames.

According to the annotation information of each of the frames, a frame, which has an annotation of the second attribute value, firstly appearing in the sample audio can be determined as a valid voice frame. Generally, there is noise fluctuation in the sample audio. A starting moment of the frame cannot be directly taken as the voice starting moment of the sample audio, but a time delay of the first preset duration is preset, if all the frames within the first preset duration after the starting moment of the frame are valid voices, that is, valid voices constantly appear for the first preset duration, then the starting moment of the frame can be taken as the voice starting moment of the sample audio.

Step S303, setting annotation information of frames before a first moment of the sample audio to the first attribute value, where the first moment=the voice starting moment+the first preset duration.

In order to ensure sufficient confidence of the voice start point, an ending moment of the first preset duration after the voice starting moment is taken as the voice start point of the sample audio, that is, the first moment is taken as the voice start point of the sample audio. In this step, the annotation information of the frames before the first moment of the sample audio is set to the first attribute value, that is, the frames before the voice start point of the sample audio are annotated as invalid voices.

Step S304, setting annotation information of frames between the first moment and a second moment of the sample audio to the second attribute value.

The second preset moment is after the first moment, and the second moment is separated from the first moment by at least the first preset duration.

Optionally, the second moment=the first moment+the first preset duration.

In order to ensure the sufficient confidence of the voice start point, an ending moment of the first preset duration after the voice starting moment is taken as the voice start point of the sample audio, that is, the first moment is taken as the voice start point of the sample audio. In this way, false positives of the voice start point can be avoided.

In this step, the annotation information of the frames after the first moment of the sample audio is set to the second attribute value, that is, the frames after the voice start point of the sample audio are annotated as valid voices.

In order to improve the accuracy of the voice start point model, a first audio segment of the initial first duration of the sample audio is intercepted as a start point training audio. This start point training audio is an audio segment of the sample audio from the starting moment to the second moment.

Step S305, taking the acoustic features and the annotation information of the frames before the second moment of the sample audio as a set of start point training data, and adding the set of start point training data to the start point training set.

In this embodiment, as shown in FIG. 4, determining the finish point training set may be specifically implemented by the following steps:

Step S401, acquiring an acoustic feature and annotation information of each of frames of the sample audio.

Step S402, determining a voice ending moment of the sample audio according to the annotation information of each of the frames of the sample audio, where an audio segment within a second preset duration after the voice ending moment is an invalid voice segment, and the second preset duration is smaller than the first preset duration.

The second preset duration is a delay time for ensuring the confidence of the voice finish point when determining the end of the voice. The second preset duration is smaller than the first preset duration. The second preset duration may be set by a technician according to actual needs. The value of the second preset duration is not specifically limited in this embodiment.

In addition, at the voice starting moment, the user is speaking, and does not need any response from the system. The longer the first preset duration is, the higher the confidence of the start point recognition model is. However, after the voice ending moment, the user waits for the system to promptly respond. The recognition of the voice finish point requires balancing the model confidence and response speed, thus the first preset duration may be set to be slightly longer, and the second preset duration is set to be slightly shorter. For example, the first preset duration may be a duration of 20 frames, and the second preset duration may be a duration of 10 frames.

According to the annotation information of each frame, a frame, which has an annotation of the second attribute value, lastly appearing in the sample audio can be determined as a valid voice frame, and frames after the frame are invalid voices. Similarly to determining the voice start point of the sample frame, a time delay of the second preset duration is preset, and if all the frames within the second preset duration after the ending moment of the frame are invalid voices, that is, invalid voices constantly appear for the second preset duration, then the ending moment of the frame can be taken as the voice ending moment of the sample audio.

Step S403, setting annotation information of frames after a third moment of the sample audio to the first attribute value, where the third moment=the voice ending moment+the second preset duration.

In order to ensure confidence of the voice start point, an ending moment of the second preset duration after the voice ending moment is taken as the voice finish point of the sample audio, that is, the third moment is taken as the voice finish point of the sample audio. In this step, annotation information of frames after the third moment of the sample audio is set to the second attribute value, that is, the frames after the voice finish point of the sample audio are annotated as invalid voices.

Step S404, setting annotation information of frames between a fourth moment and the third moment of the sample audio to the second attribute value, where the fourth moment=the third moment−the second preset duration.

The fourth preset moment is before the third moment, and the fourth moment is separated from the third moment by at least the second preset duration.

In order to ensure the confidence of the voice finish point, the ending moment of the second preset duration after the voice ending moment is taken as the voice finish point of the sample audio, that is, the third moment is taken as the voice finish point of the sample audio. In this way, false positives of the voice finish point can be avoided.

In this step, the annotation information of the frames before the third moment of the sample audio is set to the second attribute value, that is, the frames before the voice finish point of the sample audio are annotated as valid voices.

In order to improve the accuracy of the voice finish point model, a second audio segment of the last second duration of the sample audio is intercepted as a finish point training audio. This finish point training audio is an audio segment of the sample audio from the fourth moment to the ending moment.

Step S405, taking acoustic features and annotation information of the frames after the fourth moment of the sample audio as a set of finish point training data, and adding the set of finish point training data to the finish point training set.

After the start point training set and the ending point training set are determined, in the phase of model training, the start point recognition model may be obtained by using the start point training set to train the cyclic neural network model, and the finish point training set may be obtained by using the finish point training set to train the cyclic neural network model.

Optionally, the cyclic neural network used may be an LSTM (Long Short Term) network, or a GRU (Gated Recurrent Unit) network, or other cyclic neural networks.

Optionally, the start point recognition model and the finish point recognition model may be obtained by training a same type of cyclic neural network, or by training two different types of cyclic neural networks.

Preferably, the GRU network may be trained by the start point training set and the finish point training set, respectively, to obtain the start point recognition model and the finish point recognition model, so as to improve the operation efficiency of the start point recognition model and the finish point recognition model.

Optionally, when training the cyclic neural network model, the cyclic neural network model is trained by respectively using the start point training set and the finish point training set, taking a softmax function as an activation function and a cross entropy as a cost function.

In this embodiment, an output layer of the cyclic neural network model includes two output nodes, a value of one output node indicates a probability information that the audio frame is a valid voice, and a value of the other output node indicates a probability information that the audio frame is an invalid voice.

In addition, in another embodiment of the present embodiment, after the voice start point frame and the voice finish point frame of the audio to be detected are recognized, the starting moment of the voice start point frame may further be taken as the voice start point of the audio to be detected, and the starting moment of the voice finish point frame may be taken as the voice finish point of the audio to be detected; a first audio segment between the voice start point and the voice finish point of the audio to be detected may be intercepted, and the first audio segment is sent to a voice recognition device, so that only a valid voice segment may be sent to the voice recognition device, which can improve a processing efficiency of the voice recognition device.

Optionally, after the first audio segment between the voice start point and the voice finish point of the audio to be detected is intercepted, a second audio segment having a third preset duration before the voice start point may be acquired, and the second audio segment and the first audio segment may be sent to the voice recognition device, where the third preset duration is greater than the first preset duration, so as to eliminate the influence of the delay of the first preset duration.

Optionally, after the voice start point frame is determined, audio frames within the third preset duration before the voice start point frame in the audio to be detected may be buffered. For example, the first preset duration is a duration of 20 frames, and the third preset duration may be a duration of 40 frames.

In the embodiment of the present disclosure, for any sample audio in the training pre-material, by presetting the first preset duration, the first moment, which is later than the voice starting moment in the sample audio for the first preset duration, is determined as the voice start point of the sample audio. The first audio segment of the previous first duration of the sample audio is intercepted, and the acoustic feature and the annotation information of each of the audio frames within the first audio segment including the voice start point of the sample audio is taken as a set of start point training data corresponding to the start point training audio, and the set of start point training data is added to the start point training set. The confidence of the start point recognition model obtained by training the start point training set is high, which can improve the accuracy of the voice start point recognition. Similarly, by presetting the second preset duration, the third moment, which is after the voice ending moment in the sample audio for the second preset duration, is determined as the voice finish point of the sample audio. The second audio segment including the voice finish point in last of the sample audio is intercepted, and the acoustic features and the annotation information of each of the audio frames within the second audio segment is taken as a set of finish point training data corresponding to the finish point training audio, and the set of finish point training data is added to the finish point training set, where the second preset duration is set as smaller than the first preset duration, the confidence and response time of the finish point recognition model can be balanced.

Embodiment 4

Figure 5:
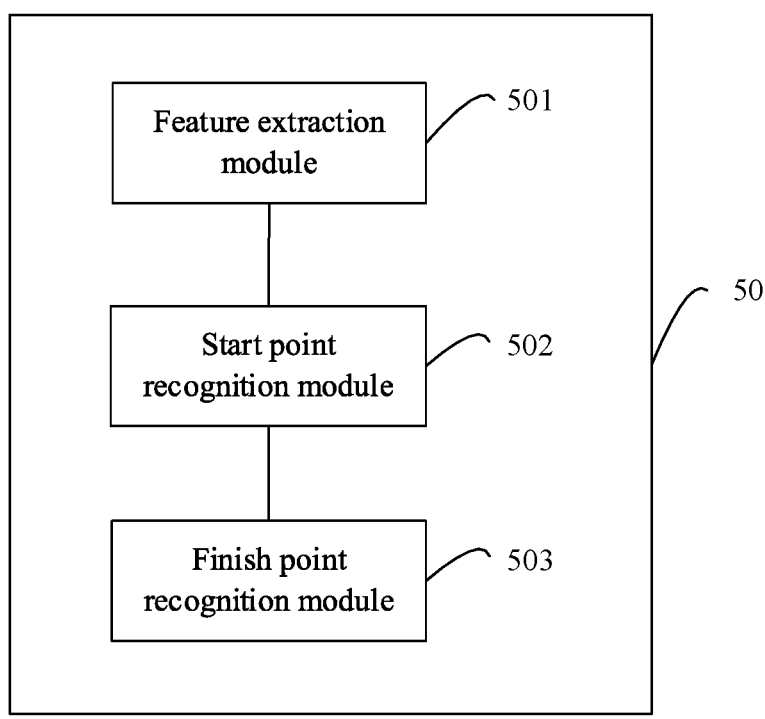
FIG. 5 is a schematic structural diagram of a voice endpoint recognition apparatus according to Embodiment 4 of the present disclosure.

FIG. 5 is a schematic structural diagram of a voice endpoint recognition apparatus according to Embodiment 4 of the present disclosure. The voice endpoint recognition apparatus according to the embodiment of the present disclosure may perform the processing procedure according to the method embodiment for recognizing voice endpoints. As shown in FIG. 5, the apparatus 50 includes a feature extraction module 501, a start point recognition module 502, and a finish point recognition module 503.

Specifically, the feature extraction module 501 is configured to extract an acoustic feature of each of audio frames of an audio to be detected.

The start point recognition module 502 is configured to recognize a voice start point frame among the audio frames according to the acoustic feature of each of the audio frames and a start point recognition model, where the start point recognition model is obtained by training a neural network with a start point training set.

The finish point recognition module 503 is configured to recognize a voice finish point frame among the audio frames according to the acoustic feature of each of the audio frames and a finish point recognition model, where the finish point recognition model is obtained by training the neural network with a finish point training set.

The start point training set includes at least one set of start point training data, and one set of start point training data includes acoustic feature and annotation information of each of frames of a start point training audio.

The finish point training set includes at least one set of finish point training data, and one set of finish point training data includes acoustic feature and annotation information of each of frames of a finish point training audio.

The annotation information is a first attribute value or a second attribute value, the first attribute value is used to annotate a frame as an invalid voice, and the second attribute value is used to annotate a frame as a valid voice.

The apparatus according to the embodiment of the present disclosure may be specifically used to perform the method embodiment according to Embodiment 1 described above, and specific functions will not be repeated here again.

In the embodiment of the present disclosure, a start point recognition model and a finish point recognition model are obtained by training a cyclic neural network with a start point training set and a finish point training set, respectively, and a voice start point frame among audio frames is recognized according to an acoustic feature of each of the audio frames and the start point recognition model, thereby avoiding affecting a delay time of a finish point frame recognition while ensuring the accuracy of the start frame recognition is as high as possible; and a voice finish point frame among the audio frames is recognized according to the acoustic feature of each of the audio frames and the finish point recognition model, thereby avoiding affecting the accuracy of the start frame recognition while ensuring the delay of the end frame recognition is as short as possible, so that the delay time of the end frame recognition is shortened while the accuracy of the start frame recognition is improved.

Embodiment 5

On the basis of Embodiment 4 described above, in this embodiment, the start point recognition module is further configured to:

sequentially take the audio frames as a first target frame, and perform a start point recognition process on the first target frame as follows: inputting an acoustic feature of the first target frame into the start point recognition model, and calculating a probability value that the first target frame is a valid voice; determining whether the first target frame is a valid voice according to the probability that the first target frame is a valid voice and a first threshold; if the first target frame is not a valid voice, taking a next audio frame as a new first target frame, and performing the start point recognition process on the new first target frame; if the first target frame is a valid voice, determining the first target frame as the voice start point frame.

The finish point recognition module is further configured to:

sequentially take audio frames after the voice point start frame as a second target frame, and perform a finish point recognition process on the second target frame as follows: inputting an acoustic feature of the second target frame into the finish point recognition model, and calculating a probability value that the second target frame is a valid voice; determining whether the second target frame is a valid voice according to the probability that the second target frame is a valid voice and a second threshold, where the second threshold is smaller than the first threshold; if the second target frame is a valid voice, taking a next audio frame as a new second target frame, and performing the finish point recognition process on the new second target frame; if the second target frame is not a valid voice, determining the second target frame as the voice finish point frame.

The apparatus according to the embodiment of the present disclosure may be specifically used to perform the method embodiment according to Embodiment 2 described above, and specific functions will not be repeated here again.

In the embodiment of the present disclosure, the audio frame may be sequentially inputted into the start point recognition model, and whether the current audio frame is the voice start point frame of the audio to be detected is determined according to an output value of the start point recognition model, if the current audio frame is not the voice start point frame, a next frame is successively inputted into the start point recognition model to determine whether the next frame is the voice start point frame of the audio to be detected, and when the voice start point frame is determined, the subsequent audio frame is stopped from being inputted into the start point recognition model; after the voice start point frame is recognized, audio frames after the voice start point frame of the audio to be detected are sequentially inputted into the finish point recognition model, and whether the current audio frame is the voice finish point frame of the audio to be detected is determined according to an output value of the finish point recognition model; if the current audio frame is not the voice finish point frame, a next frame is successively inputted into the finish point recognition model to determine whether the next frame is the voice finish point frame of the audio to be detected, and when the voice finish point frame is determined, the subsequent audio frame is stopped from being inputted into the finish point recognition model, thereby the efficiency of voice endpoint recognition can be improved.

Embodiment 6

Figure 6:
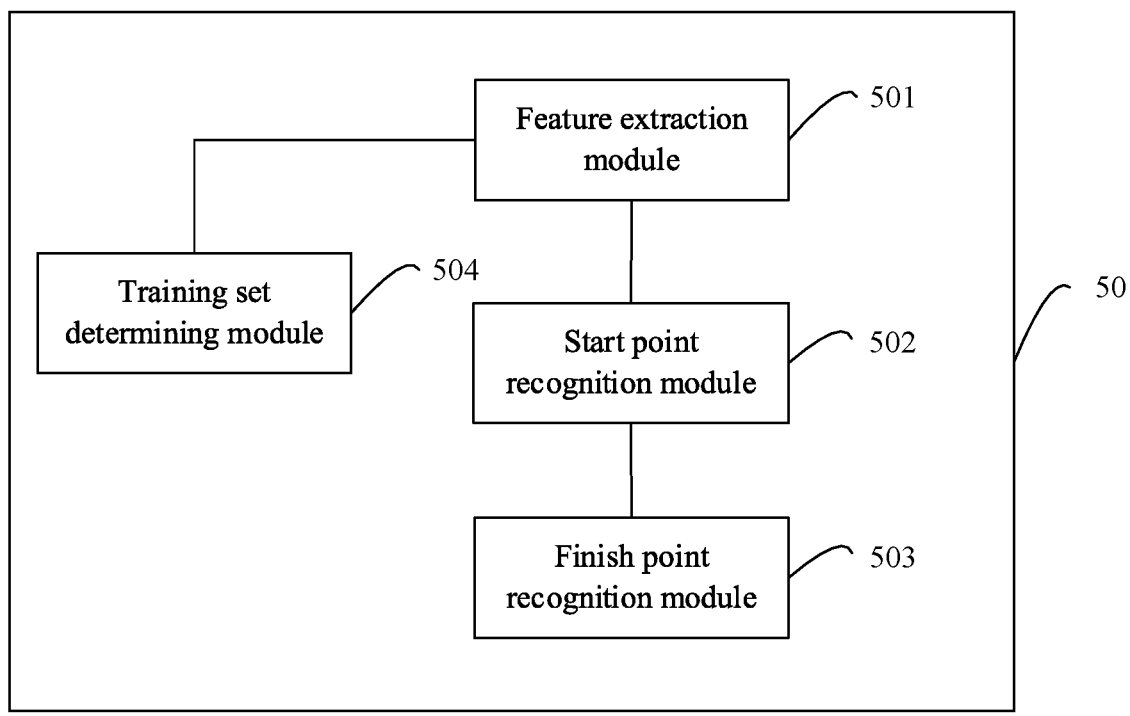
FIG. 6 is a schematic structural diagram of a voice endpoint recognition apparatus according to Embodiment 6 of the present disclosure.

FIG. 6 is a schematic structural diagram of a voice endpoint recognition apparatus according to Embodiment 6 of the present disclosure. On the basis of Embodiment 5 described above, in this embodiment, as shown in FIG. 6, the apparatus 50 further includes: a training set determining module 504.

Specifically, the training set determining module 504 is configured to:

acquire an acoustic feature and annotation information of each of frames of a sample audio; determine a voice starting moment of the sample audio according to the annotation information of the frames of the sample audio, where an audio segment within a first preset duration after the voice starting moment is a valid voice segment; set annotation information of frames before a first moment of the sample audio to the first attribute value, where the first moment=the voice starting moment+the first preset duration; set annotation information of frames between the first moment and a second moment of the sample audio to the second attribute value, where the second moment=the first moment+the first preset duration; take acoustic features and the annotation information of frames before the second moment of the sample audio as a set of start point training data, and adding the set of start point training data to the start point training set.

The training set determination module 504 is further configured to:

determine a voice ending moment of the sample audio according to the annotation information of each of the frames of the sample audio, where an audio segment within a second preset duration after the voice ending moment is an invalid voice segment, and the second preset duration is smaller than the first preset duration; set annotation information of frames after a third moment of the sample audio to the first attribute value, where the third moment=the voice ending moment+the second preset duration; set annotation information of frames between a fourth moment and the third moment of the sample audio to the second attribute value, where the fourth moment=the third moment−the second preset duration; take acoustic features and the annotation information of frames after the fourth moment of the sample audio as a set of finish point training data, and adding the set of finish point training data to the finish point training set.

Optionally, the device 50 may further include: a submitting module.

The submitting module is configured to: take a starting moment of the voice start point frame as a voice start point of the audio to be detected; take a starting moment of the voice finish point frame as a voice finish point of the audio to be detected; intercept a first audio segment between the voice start point and the voice finish point of the audio to be detected; send the first audio segment to a voice recognition device.

Optionally, the submitting module is further configured to:

acquire a second audio segment having a third preset duration before the voice start point, and send the second audio segment and the first audio segment to the voice recognition device, where the third preset duration is greater than the first preset duration.

The apparatus according to the embodiment of the present disclosure may be specifically used to perform the method embodiment according to Embodiment 3 described above, and specific functions will not be repeated here again.

In the embodiment of the present disclosure, for any sample audio in the training pre-material, by presetting the first preset duration, the first moment, which is later than the voice starting moment in the sample audio for the first preset duration, is determined as the voice start point of the sample audio. The first audio segment of the previous first duration of the sample audio is intercepted, and the acoustic feature and the annotation information of each of the audio frames within the first audio segment including the voice start point of the sample audio is taken as a set of start point training data corresponding to the start point training audio, and the set of start point training data is added to the start point training set, The confidence of the start point recognition model obtained by training the start point training set is high, which can improve the accuracy of the voice start point recognition. Similarly, by presetting the second preset duration, the third moment, which is after the voice ending moment in the sample audio for the second preset duration, is determined as the voice finish point of the sample audio. The second audio segment including the voice finish point in last of the sample audio is intercepted, and the acoustic features and the annotation information of the audio frames within the second audio segment is taken as a set of finish point training data corresponding to the finish point training audio, and the set of finish point training data is added to the finish point training set, where the second preset duration is set as smaller than the first preset duration, the confidence and response time of the finish point recognition model can be balanced.

Embodiment 7

Figure 7:
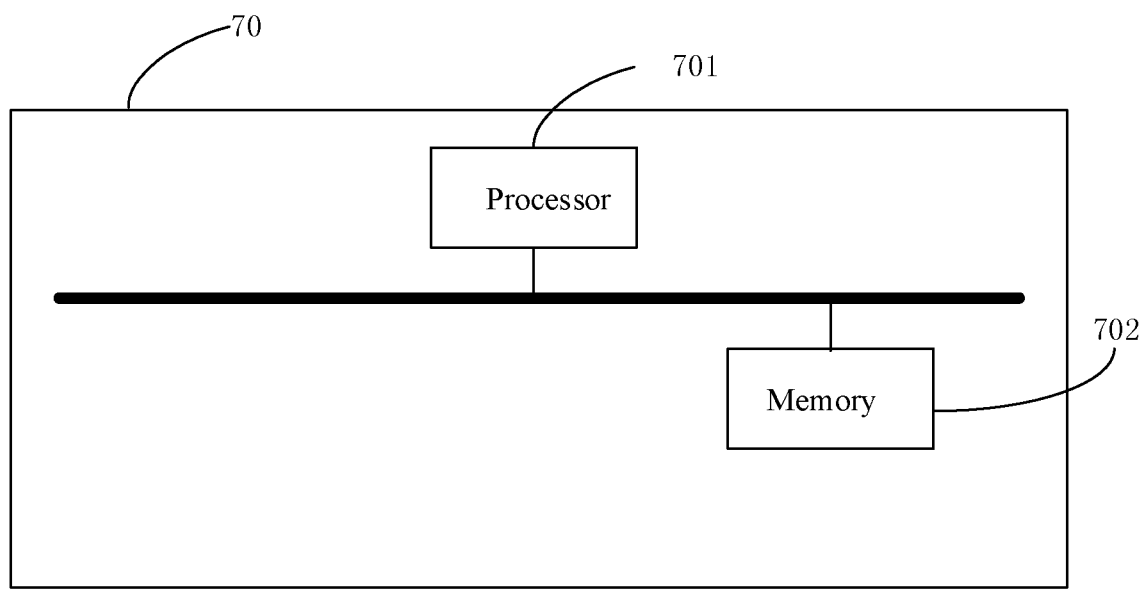
FIG. 7 is a schematic structural diagram of a computer device according to Embodiment 7 of the present disclosure.

FIG. 7 is a schematic structural diagram of a computer device according to Embodiment 7 of the present disclosure. As shown in FIG. 7, the device 70 includes a processor 701, a memory 702, and a computer program stored on the memory 702 and executable by the processor 701.

The processor 701, when executing the computer program stored on the memory 702, implements the method for recognizing voice endpoint according to any of the above method embodiments described above.

In the embodiment of the present disclosure, a start point recognition model and a finish point recognition model are obtained by training a cyclic neural network with a start point training set and a finish point training set, respectively, and a voice start point frame among audio frames is recognized according to an acoustic feature of each of the audio frames and the start point recognition model, thereby avoiding affecting a delay time of a finish point frame recognition while ensuring the accuracy of the start frame recognition is as high as possible; and a voice finish point frame among the audio frames is recognized according to the acoustic feature of each of the audio frames and the finish point recognition model, thereby avoiding affecting the accuracy of the start frame recognition while ensuring the delay of the end frame recognition is as short as possible, so that the delay time of the end frame recognition is shortened while the accuracy of the start frame recognition is improved.

In addition, an embodiment of the present disclosure further provides a computer readable storage medium with a computer program stored therein, and the computer program, when executed by a processor, implements the method for recognizing voice endpoint according to any of the above method embodiments described above.

In the several embodiments provided by the present disclosure, it should be understood that the disclosed apparatus and method may be implemented in other manners. For example, the device embodiments described above are merely illustrative. For example, the division of the units is only a division of logical functions. In actual implementation, there may be another division manner, for example, multiple units or components may be combined or integrated into another system, or some features may be ignored or not implemented. Moreover, the coupling, direct coupling or communication connection shown or discussed may be an indirect coupling or communication connection through some interfaces, devices or units, and may be in electrical, mechanical or other form.

The units described as separate components may or may not be physically separated, and the components illustrated as units may or may not be physical units, that is, may be located in one place, or may be distributed to multiple network units. Some or all of the units may be selected according to actual needs to achieve the objectives of the solution of the embodiment.

In addition, each functional unit in each embodiment of the present disclosure may be integrated into one processing unit, or each unit may exist physically separately, or two or more units may be integrated into one unit. The above integrated units may be implemented in the form of hardware or in the form of hardware plus software functional units.

The above-described integrated units implemented in the form of a software functional unit may be stored in a computer readable storage medium. The above software functional unit is stored in a storage medium and includes several instructions for causing a computer device (which may be a personal computer, a server, or a network device and the like) or a processor to perform part of the steps in the methods of the various embodiments of the present disclosure. The foregoing storage medium includes: a U disk, a mobile hard disk, a read-only memory (ROM), a random access memory (RAM), a diskette, or an optical disk, and the like, which may store a program code.

A person skilled in the art may clearly understand that for the convenience and brevity of the description, the division of functional modules described above is only exemplified. In practical applications, the above functions may be assigned to and completed by different functional modules as needed, that is, the internal structure of the apparatus is divided into different functional modules to perform all or part of the functions described above. For the specific working process of the apparatus described above, reference may be made to the corresponding process in the foregoing method embodiments, and details will not be repeated here.

Other embodiments of the present disclosure will be easy for those skilled in the art to come up with after considering the specification and practicing the present disclosure disclosed herein. The present disclosure is intended to cover any variations, usages, or adaptive changes of the present disclosure, which are in accordance with the general principles of the present disclosure and include common knowledge or customary technical means in the art that are not disclosed in the present disclosure. The specification and examples are to be regarded as illustrative only, and the true scope and spirit of the present disclosure are pointed out by the following claims.

It should be understood that the present disclosure is not limited to the precise structures described above and shown in the drawings, and various modifications and changes can be made without departing from the scope of the present disclosure. The scope of the present disclosure is limited only by the appended claims.

What is claimed is:

1. A method for recognizing voice endpoints, comprising:
   extracting an acoustic feature of each of audio frames of an audio to be detected;
   sequentially taking the audio frames as a first target frame, and performing a start point recognition process on the first target frame as follows:
   inputting an acoustic feature of the first target frame into a start point recognition model, and calculating a probability value that the first target frame is a valid voice;
   determining whether the first target frame is a valid voice according to the probability that the first target frame is a valid voice and a first threshold;
   if the first target frame is not a valid voice, taking a next audio frame as a new first target frame, and performing the start point recognition process on the new first target frame;
   if the first target frame is a valid voice, determining the first target frame as the voice start point frame; and
   recognizing a voice finish point frame among the audio frames according to the acoustic feature of each of the audio frames and a finish point recognition model, wherein the finish point recognition model is obtained by training the neural network with a finish point training set.

2. The method according to claim 1, wherein the recognizing the voice finish point frame among the audio frames according to the acoustic features of the audio frames and the finish point recognition model, wherein the finish point recognition model is obtained by training the neural network with the finish point training set, comprises:
   sequentially taking audio frames after the voice point start frame as a second target frame, and performing a finish point recognition process on the second target frame as follows:
   inputting an acoustic feature of the second target frame into the finish point recognition model, and calculating a probability value that the second target frame is a valid voice;
   determining whether the second target frame is a valid voice according to the probability that the second target frame is a valid voice and a second threshold, wherein the second threshold is smaller than the first threshold;
   if the second target frame is a valid voice, taking a next audio frame as a new second target frame, and performing the finish point recognition process on the new second target frame;
   if the second target frame is not a valid voice, determining the second target frame as the voice finish point frame.

3. The method according to claim 1, wherein the start point training set comprises at least one set of start point training data, and one set of start point training data comprises an acoustic feature and annotation information of each of frames of a start point training audio;
   the finish point training set comprises at least one set of finish point training data, and one set of finish point training data comprises an acoustic feature and annotation information of each of frames of a finish point training audio; and
   the annotation information is a first attribute value or a second attribute value, wherein the first attribute value is used to annotate a frame as an invalid voice, and the second attribute value is used to annotate a frame as a valid voice.

4. The method according to claim 3, wherein the method further comprises:
   acquiring an acoustic feature and annotation information of each of frames of a sample audio;
   determining a voice starting moment of the sample audio according to the annotation information of each of the frames of the sample audio, wherein an audio segment within a first preset duration after the voice starting moment is a valid voice segment;
   setting annotation information of frames before a first moment of the sample audio to the first attribute value, wherein the first moment is a sum of the voice starting moment and the first preset duration;
   setting annotation information of frames between the first moment and a second moment of the sample audio to the second attribute value, wherein the second moment is a sum of the first moment and the first preset duration;
   taking acoustic features and the annotation information of frames before the second moment of the sample audio as a set of start point training data, and adding the set of start point training data to the start point training set.

5. The method according to claim 4, wherein the method further comprises:
   determining a voice ending moment of the sample audio according to the annotation information of each of the frames of the sample audio, wherein an audio segment within a second preset duration after the voice ending moment is an invalid voice segment, and the second preset duration is smaller than the first preset duration;
   setting annotation information of frames after a third moment of the sample audio to the first attribute value, wherein the third moment is a sum of the voice ending moment and the second preset duration;
   setting annotation information of frames between a fourth moment and the third moment of the sample audio to the second attribute value, wherein the fourth moment is a difference of the third moment and the second preset duration;
   taking acoustic features and the annotation information of frames after the fourth moment of the sample audio as a set of finish point training data, and adding the set of finish point training data to the finish point training set.

6. The method according to claim 1, after determining the voice start point frame and the voice finish point frame of the audio to be detected, further comprising:
- taking a starting moment of the voice start point frame as a voice start point of the audio to be detected;
- taking a starting moment of the voice finish point frame as a voice finish point of the audio to be detected;
- intercepting a first audio segment between the voice start point and the voice finish point of the audio to be detected;
- sending the first audio segment to a voice recognition device.

7. The method according to claim 6, wherein after the intercepting the first audio segment between the voice start point and the voice finish point of the audio to be detected, the method further comprises:
- acquiring a second audio segment having a third preset duration before the voice start point, and sending the second audio segment and the first audio segment to the voice recognition device, wherein the third preset duration is greater than the first preset duration.

8. A computer readable storage medium, wherein a computer program is stored therein,
- the computer program, when executed by a processor, implements the method according to claim 1.

9. A voice endpoint recognition apparatus, comprising:
- a memory, a processor, and a computer program stored on the memory and operable on the processor,
- wherein the processor, when running the computer program, is configured to:
- extract an acoustic feature of each of audio frames of an audio to be detected;
- sequentially take the audio frames as a first target frame, and perform a start point recognition process on the first target frame as follows:
- inputting an acoustic feature of the first target frame into a start point recognition model, and calculating a probability value that the first target frame is a valid voice;
- determining whether the first target frame is a valid voice according to the probability that the first target frame is a valid voice and a first threshold;
- if the first target frame is not a valid voice, taking a next audio frame as a new first target frame, and performing the start point recognition process on the new first target frame;
- if the first target frame is a valid voice, determining the first target frame as the voice start point frame; and
- recognize a voice finish point frame among the audio frames according to the acoustic feature of each of the audio frames and a finish point recognition model, wherein the finish point recognition model is obtained by training the neural network with a finish point training set.

10. The apparatus according to claim 9, wherein the processor is further configured to:
- sequentially take audio frames after the voice point start frame as a second target frame, and perform a finish point recognition process on the second target frame as follows:
- inputting an acoustic feature of the second target frame into the finish point recognition model, and calculating a probability value that the second target frame is a valid voice;
- determining whether the second target frame is a valid voice according to the probability that the second target frame is a valid voice and a second threshold, wherein the second threshold is smaller than the first threshold;
- if the second target frame is a valid voice, taking a next audio frame as a new second target frame, and performing the finish point recognition process on the new second target frame;
- if the second target frame is not a valid voice, determining the second target frame as the voice finish point frame.

11. The apparatus according to claim 9, wherein the start point training set comprises at least one set of start point training data, and one set of start point training data comprises an acoustic feature and annotation information of each of frames of a start point training audio;
- the finish point training set comprises at least one set of finish point training data, and one set of finish point training data comprises an acoustic feature and annotation information of each of frames of a finish point training audio; and
- the annotation information is a first attribute value or a second attribute value, wherein the first attribute value is used to annotate a frame as an invalid voice, and the second attribute value is used to annotate a frame as a valid voice.

12. The apparatus according to claim 11, wherein the processor is further configured to:
- acquire an acoustic feature and annotation information of each of frames of a sample audio;
- determine a voice starting moment of the sample audio according to the annotation information of the frames of the sample audio, wherein an audio segment within a first preset duration after the voice starting moment is a valid voice segment;
- set annotation information of frames before a first moment of the sample audio to the first attribute value, wherein the first moment is a sum of the voice starting moment and the first preset duration;
- set annotation information of frames between the first moment and a second moment of the sample audio to the second attribute value, wherein the second moment is a sum of the first moment and the first preset duration;
- take acoustic features and the annotation information of frames before the second moment of the sample audio as a set of start point training data, and add the set of start point training data to the start point training set.

13. The apparatus according to claim 12, wherein the processor is further configured to:
- determine a voice ending moment of the sample audio according to the annotation information of each of the frames of the sample audio, wherein an audio segment within a second preset duration after the voice ending moment is an invalid voice segment, and the second preset duration is smaller than the first preset duration;
- set annotation information of frames after a third moment of the sample audio to the first attribute value, wherein the third moment is a sum of the voice ending moment and the second preset duration;
- set annotation information of frames between a fourth moment and the third moment of the sample audio to the second attribute value, wherein the fourth moment is a difference of the third moment and the second preset duration;
- take acoustic features and the annotation information of frames after the fourth moment of the sample audio as a set of finish point training data, and add the set of finish point training data to the finish point training set.

14. The apparatus according to claim 9, wherein the processor is further configured to:

take a starting moment of the voice start point frame as a voice start point of the audio to be detected;

take a starting moment of the voice finish point frame as a voice finish point of the audio to be detected;

intercept a first audio segment between the voice start point and the voice finish point of the audio to be detected;

send the first audio segment to a voice recognition device.

15. The apparatus according to claim 14, wherein the processor is further configured to:

acquire a second audio segment having a third preset duration before the voice start point, and send the second audio segment and the first audio segment to the voice recognition device, wherein the third preset duration is greater than the first preset duration.

* * * * *